Dec. 3, 1968 W. J. RICHMOND ET AL 3,413,882
MEANS FOR ADJUSTING POSITION OF SHEAR BOLSTER
Filed July 22, 1966 2 Sheets-Sheet 1

INVENTORS
WILLIAM J. RICHMOND &
KENNETH HOLLINGWORTH
BY
*Henry C. Westin*
THEIR ATTORNEY

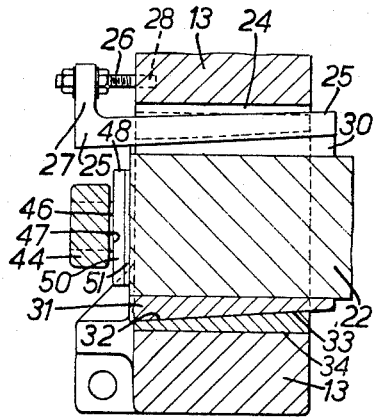
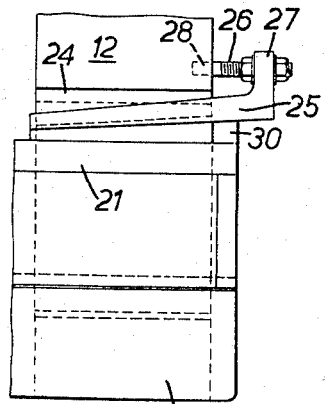
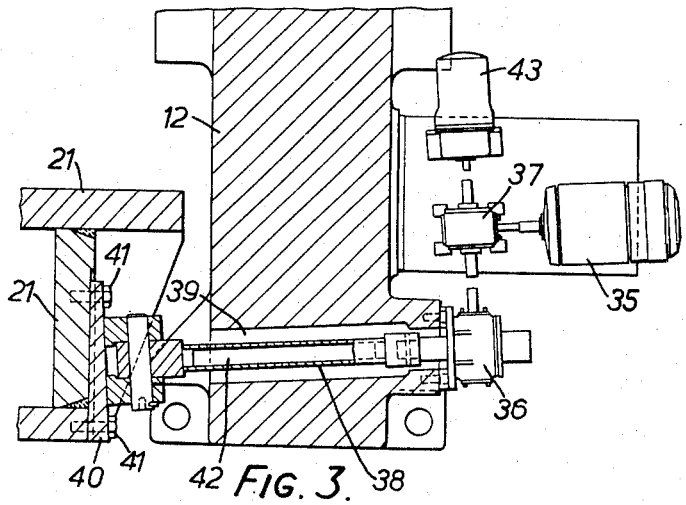
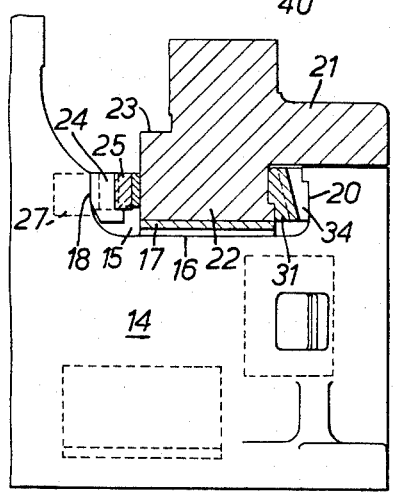

United States Patent Office 3,413,882
Patented Dec. 3, 1968

3,413,882
MEANS FOR ADJUSTING POSITION OF SHEAR BOLSTER
William James Richmond and Kenneth Hollingworth, Sheffield, England, assignors to Davy and United Engineering Company Limited, Sheffield, England
Filed July 22, 1966, Ser. No. 567,123
Claims priority, application Great Britain, July 23, 1965, 31,612/65
6 Claims. (Cl. 83—641)

ABSTRACT OF THE DISCLOSURE

The disclosure of this invention relates to a cross-cut shear having a pair of spaced-apart housings which receive an upper blade and a shear bolster which carries a lower shear blade. The bolster is provided with tapered faces for engaging similar tapered faces provided on the housings of the shear. A motor is provided to move the bolster relative to the housing and along the faces to vary the blade gap.

---

This invention relates to shears and particularly to cross-cut shears. In a shear the separation of the blades for optimum performance varies with the thickness of the material to be cut. Conventionally the lower blades are fixed and the upper blades can only be moved manually by adjustment of shims or the like.

According to the present invention a shear apparatus has a shear bolster adapted to carry a lower shear blade, the bolster being mounted slidably between housings of the shear and movable by a motor so that, on movement of the bolster by the motor, the bolster is moved normal to the cutting direction accurately to vary the blade gap.

The invention includes the apparatus with the motor coupled to the shear bolster.

Preferably the bolster has taper faces on at least one side thereof, in slidable contact with corresponding taper faces on the shear housings, the bolster being movable by the motor along the said faces of the housings to vary the blade gap. It is desirable that the bolster has taper faces on both sides thereof.

The bolster is preferably supported in forward extensions of feet of the housings.

The co-operating taper surfaces on the, or both sides, of the bolster can be dove-tailed with each other to withstand lifting forces on the bolster due to blade shearing movement.

Stop means are preferably provided for preventing the blade gap from being adjusted to zero or the blades driven to overlap.

Figure 1B:
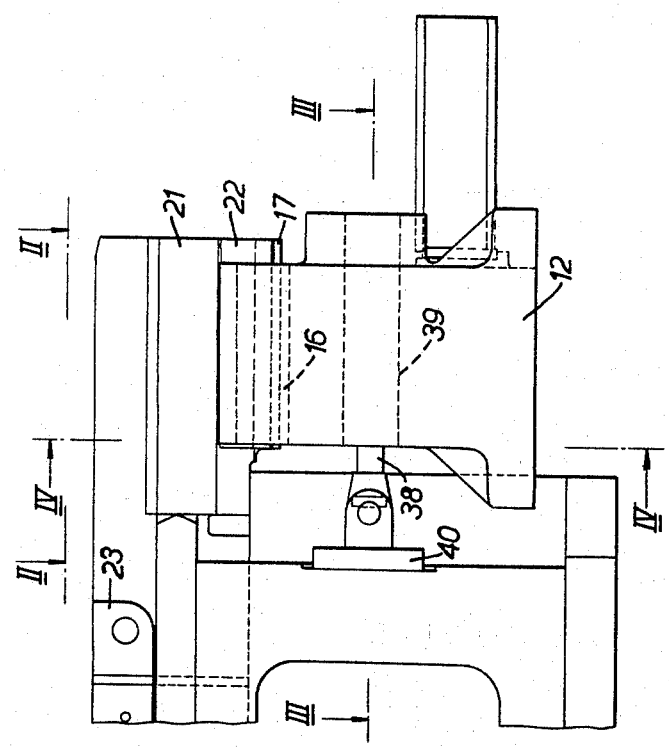
Figure 1A:
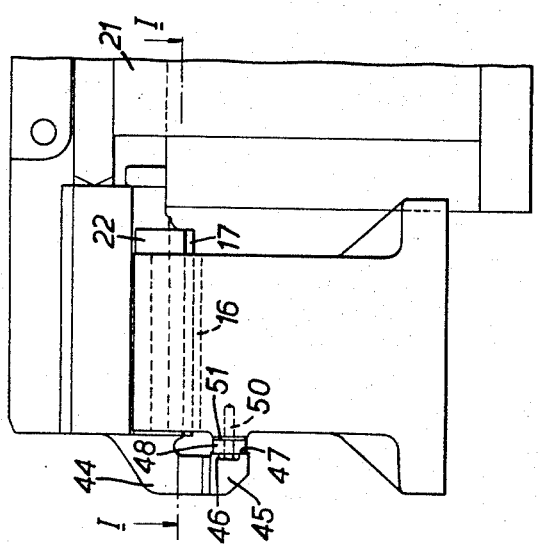

One embodiment of a cross-cut shear apparatus, will now be described, by way of example only, with reference to the drawings which accompanied the provisional specification and of which:

FIGURE 1 is a front view of the lower part of the shear, the part *a* showing the offside housing and the part *b* showing the drive-side housing, FIGURE 2 is a plan sectional view of the lower part of the shear, the part *a* being a section on the line I—I of FIGURE 1, and the part *b* being a plan view on the line II—II of FIGURE 1, FIGURE 3 is a plan sectional view through the drive-side housing taken on the line III—III of FIGURE 1, and FIGURE 4 is a sectional view showing the drive-side housing and bolster support, taken on the line IV—IV of FIGURE 1.

A cross-cut shear has a pair of housings, the drive-side housing being shown at 12 and the offside housing at 13; each of the housings has a forward extension 14 at its foot, the extension 14 having horizontal channels 15 in their upper surfaces, each channel having a base 16 on which is supported a wear plate 17 and having vertical front and rear faces 18, 20 respectively. A lower bolster 21, of hollow box form, extends between the housings and has a front portion 22 extending into the channels 15 and supported on the wear plates 17 for sliding movement. The bolster 21 is adapted to support a lower blade at 23.

Secured to the vertical face 18 at the front of the channel 15 of the drive-side housing is a taper block 24, the inner surface of which tapers in a direction parallel to the the length of the bolster and which engages a corresponding taper face on the front surface of a taper wedge 25 adjustably secured to the front of the housing by a bolt 26 engaging a flange 27 of the wedge 25 and passing into the housing at 28. The inner surface of the taper wedge also tapers parallel to the length of the bolster and engages a corresponding tapered surface, of the bolster, on a taper block 30 secured to the outer vertical surface of the portion 22 of the bolster. Secured to the back vertical face of the portion 22 is a further taper block 31 having a taper face 32 engaging a corresponding taper face 33 of a taper block 34 secured to the back vertical face 20 of the associated channel 15. The taper faces 32, 33 correspond to the co-operating taper surfaces of the taper wedge 25 and the block 30. The taper faces 32, 33 are also dove-tailed in the other direction as seen in FIGURE 4, to prevent the bolster lifting. The arrangement is similar on the offside housing except that the taper wedge 25 is of different shape so that the adjustment bolt 26 remains at the front of the housing. Before operation the bolts 26 are adjusted to obtain the correct clearances between the bolster and housing to allow easy sliding movement without excessive looseness.

Mounted on the drive-side housing is a motor 35 arranged to drive a worm gear jack 36 through a coupling and worm reduction unit 37, the jack being coupled to a shaft 38 extending through a channel 39 in the foot of the housing 12 and connected to a plate 40 bolted at 41 to the foot of the bolster 21. The shaft 38 is at the same angle as the taper faces 32, 33 and the motor 35 is arranged to drive it in either direction parallel to its axis 42. The worm reduction unit 37 is also arranged to drive a selsyn transmitter 43 which is calibrated to give a continuous reading of the blade gap.

At the front of the offside housing 13 the bolster 21 has secured to it a stop 44 having a downwardly extending leg 45 the inner surface 46 of which faces the outer surface 47 of an abutment 48 secured by bolts 50 to the front face of the housing 13. The position of the abutment 48 is determined by a shim 51 between the abutment and the housing. The size of shim is chosen so that the surfaces 46, 47 abut one another to prevent movement of the lower blade to a position in which it is too close to the upper blade or overlaps the upper blade.

To adjust the blade separation the motor 35 is driven, thus driving the shaft 38 to move the bolster between the taper wedge 25 and block 34 so that the co-operating taper surfaces cause the bolster to move towards and away from the upper blade until the desired blade gap registered by the selsyn 43 is achieved. By this means the automatic adjustment of the blade gap can be made whenever necessary.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

What is claimed is:

1. A shear apparatus having housings for receiving an upper shear blade and a shear bolster adapted to carry a lower shear blade,
   said bolster being mounted slidably between said housings of said shear and having tapered faces on at least one side thereof,
   said housings having tapered faces corresponding to the tapered faces of said bolster with which they slidably contact, and
   a motor for causing said bolster to move along said faces of said housing to vary the blade gap.

2. A shear apparatus according to claim 1 wherein the bolster has taper faces on both sides thereof.

3. A shear apparatus according to claim 1 wherein the co-operating taper surfaces on the side, or both the sides, of the bolster are dove-tailed to withstand lifting forces on the bolster during blade shearing movement.

4. A shear apparatus according to claim 1 wherein the bolster is supported in forward extension of the feet of the housing.

5. A shear apparatus according to claim 1 wherein stop means are provided to prevent the blade gap from being adjusted to zero or the blades from being driven to overlap.

6. A shear apparatus according to claim 1 including a said motor coupled with the said bolster.

References Cited

UNITED STATES PATENTS

| 2,193,148 | 3/1940 | Thomas | 83—641 |
| 3,163,072 | 12/1964 | Pearson et al. | 83—641 X |

FOREIGN PATENTS

| 290,451 | 5/1928 | Great Britain. |

ANDREW R. JUHASZ, *Primary Examiner.*